July 20, 1943.  E. MITTELMANN  2,324,525

METHOD OF AND APPARATUS FOR HEAT TREATING METAL

Filed March 22, 1941  2 Sheets—Sheet 1

Inventor
Eugen Mittelmann
By
Atty.

Patented July 20, 1943

2,324,525

UNITED STATES PATENT OFFICE 2,324,525

METHOD OF AND APPARATUS FOR HEAT TREATING METAL

Eugen Mittelmann, Chicago, Ill.

Application March 22, 1941, Serial No. 384,662

15 Claims. (Cl. 219—13)

This invention relates to the art of heat treating and more particularly to a method of and apparatus for the controlled heat treatment of metals, including an electrical induction circuit to be used in connection with said heat treatment of metals.

It has heretofore been proposed that spark-gap high-frequency generators be used to supply the high-frequency current necessary to induce heat into metal pieces and the like adapted to be hardened or annealed, but the degree of control possible by the use of such generators, using electric generator sets to supply the power to the spark-gap has been practically non-existent. The reason for this is that the spark-gap generator represents a low impedance source, one which will not vary in regulation characteristic with variations of the impedance of the load. Hence, in the common use of such induction heating methods, the amount of heat application is entirely empirically determined. This, of course, requires compilation of charts, tables, graphs and the like which must be experimentally made for each particular piece of material treated.

In my new method and means I utilize the operational characteristics of a simple vacuum-tube circuit for effecting a complete control over the heat-treating operations, thereby eliminating the expense of motor generator equipment and fixtures and also eliminating time necessary to compile operational data and the waste involved in operating the motor-generator or spark-gap type of induction device, or any other motor-generator apparatus.

It is the primary object of this invention to provide a novel and improved method of and means for the heat treatment of metals by means of electrical induction.

A further object of this invention is to provide a novel and improved method of and means for heat treating metals which will enable the heat treatment to be controlled at all times.

A further object of this invention is to provide novel and improved apparatus for heat treating metal which will comprise a suitably arranged electronic circuit with means permitting automatic control of any one or more of a number of desired operations.

A further object of this invention is to provide a heat treating method and means which will regulate and control the heating of the metal automatically by reason of the influence of the magnetic and physical properties of the metal.

An important object of this invention is to provide a novel method of and means for the heat treatment of a metal member by high frequency induction wherein substantial amounts of power, as desired, may be induced into the metal member, regardless of permeability changes thereof, without in any way disturbing operating conditions existing between the high frequency generator utilized and the source of power for said generator.

A further object of the invention is to provide a novel method of and means for the heat treatment of a metal member by high-frequency induction wherein, when the rise in temperature of the metal member has changed the impedance of the generator load from its initial value to another given value, a rematching of the generator to the load will automatically occur.

Still a further object of the present invention is to provide a method and means for the heat treatment of metals which will utilize a definite relationship between the operational characteristics of the heating device and the magnetic and physical behavior of the metal for the purpose of controlling the heat treatment.

Other objects of the invention reside in providing various automatic control means for the protection of the device, for the feeding of the metal into the operating portion of the device, for the maintenance of the matched impedance in various portions of the device, for the sequential operation of various portions of the device, and for the operation and discontinuance of operation of still other portions of the device, all of said automatic control means being dependent for operation upon the operational characteristics of the device having a definite relationship with the behavior of the metal while undergoing the heat treatment.

With the foregoing and other objects in view which will appear as the description proceeds, the invention consists of certain novel features of construction, arrangement and combination of electrical and mechanical parts and elements, procedures, modes and steps of practice, hereinafter fully described, symbolically illustrated in the accompanying drawings, and particularly pointed out in the appended claims, it being understood that the various changes in the form, proportion, size and minor details and arrangements of the various elements of the apparatus and in the details of procedure of the method may be made without departing from the spirit or sacrificing any of the advantages of the invention.

For the purpose of facilitating an understanding of my invention, I have illustrated in the accompanying drawings a preferred embodiment of the apparatus thereof and data explanatory of the operational characteristics and principles involved, from an inspection and examination of which, when considered in connection with the following description, my invention, its mode of construction, assembly, operation, arrangement of the elements thereof, the mode of practicing same, and many of its advantages and features should be readily understood and appreciated.

Referring to the drawings in which the same characters of reference are employed to indicate the corresponding or similar parts throughout the several figures of the drawings.

In general my invention contemplates a high-frequency generator, the regulation characteristic of which will vary in accordance with the behavior of the load under operating conditions. Knowing that the behavior of the generator circuit or device represents various conditions occuring in the piece of metal, for example, that is being treated, I utilize those operational behaviorisms to operate various control means to perform certain other operations, such as for example, turning off the generator, quenching the metal piece, altering the matching impedance of the circuit, and the like.

It should be appreciated, before actually discussing my improved and preferred apparatus in detail, that it may be possible for a motor-generator device to be constructed in which the regulation will vary with the load to a certain degree and in which case some degree of regulation or control may be possible. For complete flexibility and control, however, I utilize a vacuum-tube circuit which I shall presently describe and which lends itself to accomplishment of the features which are part of this invention in a highly advantageous and efficient manner.

When a metal member is disposed within a magnetic field, as for example by placing same within a coil energized by electrical current, there is a threading of the metal by magnetic flux in the well known manner. If the electrical current is alternating, the flux will be constantly changing, resulting in eddy currents through the metal which, because of their being short circuited, serve to heat the metal. The intensity of heat produced by these currents depends obviously upon the strength of the magnetic field, the frequency of the current, and the magnetic permeability of the metal itself.

Figure 1:
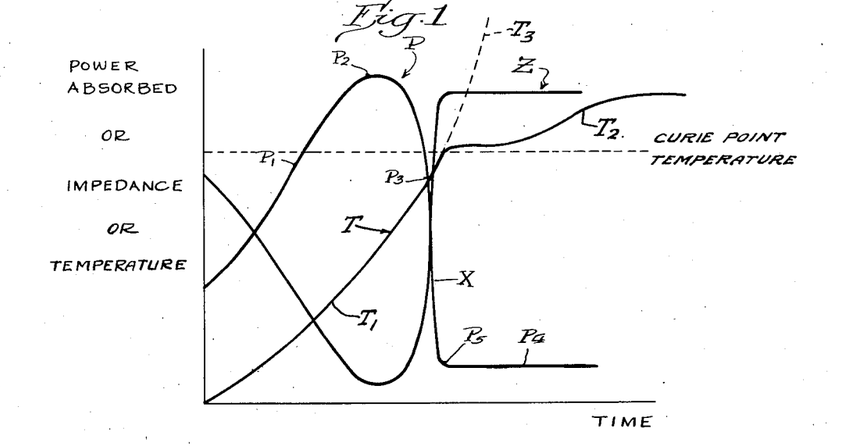
Fig. 1 is a graph indicating various characteristics of the apparatus of my invention and of a member of metal treated by means of my invention.

The metal will increase in temperature because of the losses resulting from the heating in accordance with a certain well known law or principle which is represented in the graph of Fig. 1. Attention is directed to the line marked P which represents the power absorbed by the metal piece within the coil, under any given set of operating conditions and steady power input to the generator, with respect to the time it is subjected to these conditions. It will be noted that the power which is absorbed steadily rises along the line $P_1$, reaches a peak at $P_2$, and immediately thereafter rapidly drops along the line $P_3$ to a constant value represented by $P_4$. The point $P_5$ at which the power absorption drops to its lower level is known as the Curie point, or the point of magnetic transformation. At the Curie point, the magnetic permeability of the metal becomes unity and the field strength is a minimum.

The alteration of field strength, of course, has its effect upon the characteristics of the electrical circuit causing the heating. That effect will be manifest in alteration of the impedance of the coil surrounding the metal piece and serving to induce the eddy currents therein. Disregarding the generator and looking into the "heating" coil circuit itself, electrically, it will be obvious that as a result of the power being absorbed, the impedance of the coil circuit will vary in accordance with the power absorbed, the impedance being about inversely proportional to the power. Thus the curve of the graph of Fig. 1 which represents impedance of the coil circuit or load may be represented by Z as being the reverse of the power absorption curve P.

The impedance of the load is seen to suddenly jump to a maximum after the Curie point has been reached and passed. The metal member absorbs power along the line $P_4$ at a steady rate of a considerably reduced value because of the sudden increase in load impedance. For any given steady power input to the generator, a typical temperature curve is represented by T in Fig. 1. The temperature rises along the line $T_1$ until the Curie point at which the sudden change of power absorbed and impedance causes a sudden change in the rate of temperature increase. Then the temperature rises slowly, tapering off along a line $T_2$ representing temperatures corresponding to the power absorbed along the line $P_4$. The temperature of the metal member may, under certain conditions, drop considerably after the Curie point has been reached and continue to decrease if the radiation losses consume more power than can be absorbed by the member from the generator. In any event, it is obvious that in order to raise the temperature of the metal member to any appreciable degree above that attained at the Curie point, it will be necessary to cause the metal member to continue to absorb substantially the same quantity of power as it had been absorbing up to the time that the Curie point was reached.

For steel working processes requiring high temperatures, the time within which the piece must reach the required temperature is so short as to make temperature increase along a line $T_2$ impractical and uneconomical, if not impossible.

It has been the practice in induction heating processes to increase the generator power input immediately that the Curie point has been reached and force power absorption along a line parallel to $P_4$ but above it. This is done by increasing the excitation of the fields of the machines supplying the electrical power. The increase of ampere turns serves to draw a much greater reactive component of current from the line than the already greatly reactive component being drawn prior to the reaching of the Curie point. If no power factor correcting means is used in the line, the cost of such practice is very high. Other methods employ shielding and auxiliary heating means to raise the temperature of the member. The temperature control possible by these methods is more or less empirical and the cost very high in comparison to that of my new method.

In my invention, the entire process is under control at all times. The generator which I use is provided with means comprising one or more control circuits in which the characteristic Z and P curves of Fig. 1 are reflected as electrical properties of said circuit or circuits. I provide means to be actuated by said circuit or circuits at any time or times with respect to the electrical and physical condition of the metal member as reflected in the control circuit. Therefore, any chosen point or points of the P curve, for example, may be chosen for the operation of said means. The means employed may cut off the power of the oscillator, quench the metal member, start auxiliary equipment, cause changes in the circuit arrangement, or do any number of these things sequentially, or simultaneously.

For example, the problem described above, namely of supplying more power to the metal member after the Curie point has been reached, is economically solved in a simple manner by my invention. As previously mentioned, the spark-gap or motor-generator type of generators have low impedance resulting in substantially no change in generator impedance for change in load impedance. Now, it is well known that the greatest transfer of energy from a feeding circuit to a fed circuit occurs when the impedance looking into each circuit is the same. Obviously, then, this type of inflexible generator operates at a low efficiency since under no practical conditions is the generator ever matched to the load, whether operating at normal power input prior to reaching the Curie point or whether operating at increased power input after the Curie point has been reached.

In my invention, the load is matched with the generator at the start of the process, so that a maximum of energy can be transferred to the piece. After the Curie point is reached, the impedance of the load has jumped, a control circuit automatically rematches the generator to the load, thereby permitting a greater power to be forced into the member at substantially the same rate that it was being absorbed prior to the Curie point being reached. The temperature of the metal member can thus be simply and quickly raised, as shown in Fig. 1, along the broken line $T_3$, to any desired value. During the entire process the generator input has remained at practically the same low value as at initial conditions; there have been no changes in operating conditions; and the extra power drawn from the line has had no effect on power factor. The economy, control and efficiency of the process obviously are not even approached by known apparatus and methods.

In my invention I use a novel vacuum-tube oscillator to supply the high-frequency power necessary to treat the metal. The tubes of the oscillator are grid-biased so that they operate essentially as class C oscillators on the curved portion of the $I_p$–$E_g$ curve. Now, by alteration of the factor of merit Q of the coil of the tank circuit which is done by increasing the loss of the coil, that is, the power absorbed by the metal piece, there must be a corresponding alteration in the plate current of the oscillator. As the Q of the tank circuit of the oscillator decreases, the plate current of the tubes will increase. This may be understood by visualizing the equivalent circuit of the oscillator tube which includes a relatively constant voltage. As the load is increased, the plate voltage remaining practically constant, the plate current must increase. The increase of plate current will vary with the load because tubes are being operated upon the curved portions of their characteristics.

Since the plate current of the oscillator will vary with the load, it is obvious that the variation will closely follow the curve represented by P in Fig. 1 and will have portions corresponding to $P_1$, $P_2$, etc.; hence, for any given piece of metal being heated by the oscillator, at the point that the plate current reaches the value corresponding to $P_5$ of the curve P, the Curie point will have been reached and can be used, for example, as a point of discrimination in the operation of various devices to cause an automatic cyclic control of the device. Obviously other points along the P curve could be so utilized.

Figure 2:
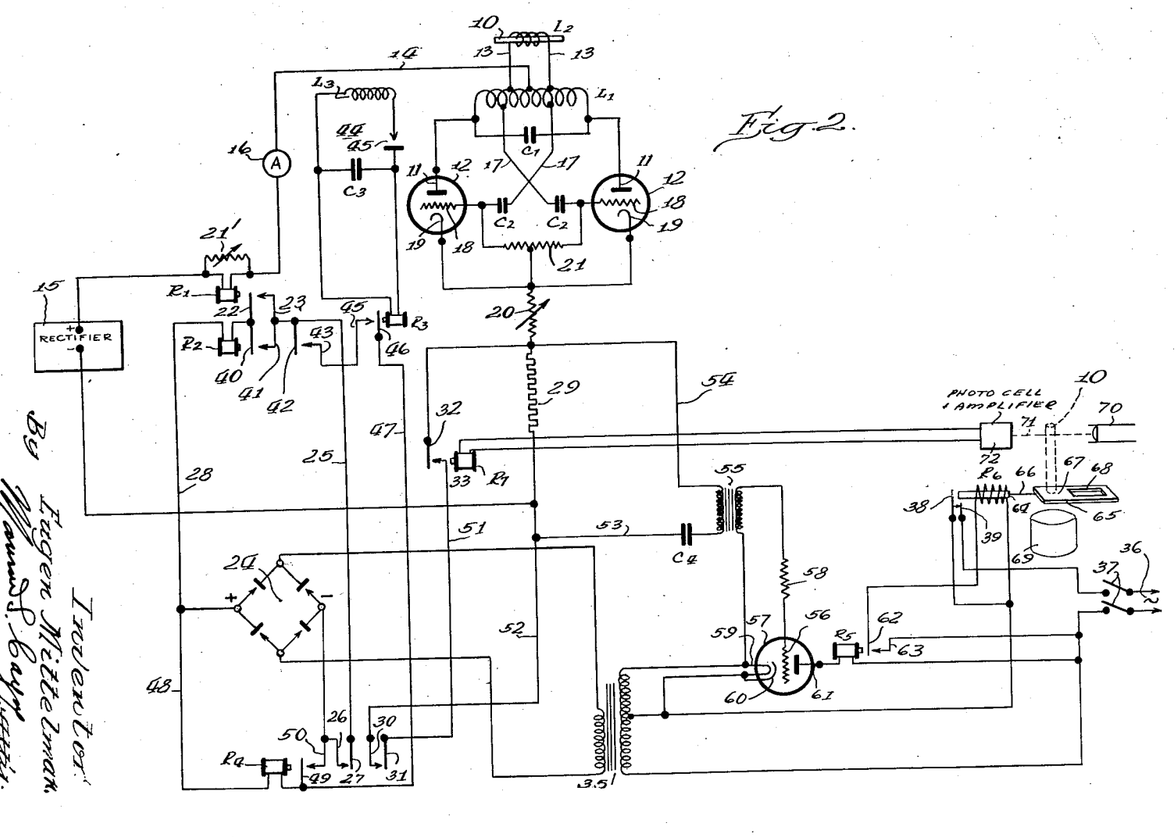
Fig. 2 is a schematic circuit drawing of the apparatus of my invention.

Referring now to the circuit diagram shown in Fig. 2, I have utilized as the basis for my circuit a pair of high powered triodes 12, 12 designed to utilize a plate voltage of approximately 3000 volts supplied by an appropriate rectifying circuit and designed for a plate current of approximately one ampere maximum. This arrangement is intended to produce a power output of approximately two kilo-watts when the tubes 12 are used in the well known push-pull arrangement and the circuit constants are adjusted for a frequency of approximately one megacycle.

The plates 11 of the tubes 12 are connected to the opposite ends of the primary coil $L_1$ of the tank circuit which is in parallel with an appropriate condenser $C_1$. Tapped off from the primary coil $L_1$ at appropriate positions are a pair of leads 13 which connect to opposite ends of the heating coil $L_2$ within which the metal piece 10 is adapted to be positioned for the heat treating operation.

This arrangement is a novel and advantageous one and permits the operation of my apparatus at its maximum efficiency, as will presently be explained.

In any heater coil associated with high-frequency induction heating apparatus, the coil, together with the metal member within it, represents a certain load impedance, the magnitude and phase angle of which depends upon the dimensions of the coil, upon the geometrical and electrical relation of the coil to the metal member within it, and upon various other factors, all of which affect the coupling of the coil with the metal member. The interdependence of the electrical properties of coil and member will, therefore, cause varying load impedances due to changes in the physical and electrical state of the metal member while being heated.

The practice has heretofore been to connect the heater coil parallel to the tank circuit of the generator. The coil is thus a frequency-determining part of the oscillatory or tank circuit. This has even been the practice where it has been proposed using thermionic oscillators. The internal impedance of thermionic generators is of a higher order than that of loads comprising coils and members, and hence the energy transfer is very inefficient due to the poor power factor. The maximum amount of energy transfer is therefore dependent upon the size of the capacitance in the circuit since the heater coil is parallel therewith.

As will be noted from the diagram of Fig. 2, my heater coil $L_2$ is not connected parallel with the tank circuit, but rather is connected with a fraction of the total impedance of the tank circuit inductance $L_1$. Thus the heater coil $L_2$ and member 10, together constituting the load, may be matched in impedance with the internal impedance of the generator looking into the terminals 13—13, while at the same time the total circuit impedance for optimum efficiency and power output of the thermionic tubes 12—12 may be maintained.

The heater coil may also be coupled with a fraction of the tank circuit impedance by reactive impedances, but the method I have illustrated and described is the simplest. With the coil $L_2$ tapped from a few turns of the coil $L_1$, only simple connections are made, and the heater may be maintained at ground potential, so far as the substantially D. C. potentials are concerned. This is possible since the center tap 14, corresponding to the positive terminal of the high tension plate supply circuit, is grounded.

With the above described coupling, the tank circuit is always at resonance and hence the tubes 12 are always operating at their maximum efficiency. The frequency of the tank circuit will vary but slightly, and the tank circuit presents essentially a substantially pure ohmic resistance to the passage of plate current. Since the resistance varies as the load, that is, heater $L_1$ and member 10, the plate current will vary as the load and give the desired reactions in the control circuits 44 and 14. In the absence of the arrangement described, the heater coil would form part of the frequency determining tank circuit, and the plate current would depend primarily upon the ratio of L/C in the tank circuit. If L were sufficiently small, variations of additional load resistance, as caused by increase in temperature of the member 10 would not appreciably influence the plate current, thus failing under these conditions, to give the desired reflected variation of plate current permitting use of the control circuits 44 and 14 in the manners described.

The center tap 14 of the primary coil $L_1$ is the plate lead and connects with an appropriate supply of plate voltage which is represented as a rectifier 15. The lead 14 has a plate current meter 16 in the circuit and also the coil of the relay $R_1$ positioned to receive plate current. The feed-back leads 17 are connected to taps on opposite sides of the midpoint of the tank primary coil $L_1$ and lead to the grids 18 of the tubes 12 through appropriate condensers $C_2$. This is, of course, a conventional connection and serves to feed to each tube 12 a voltage which is 180° out of phase with the impressed voltage thereby promoting the oscillation of the tubes.

The negative terminal of the rectifier 15 leads to the cathodes through an appropriate cathode resistor 20 which is variable in order to enable an appropriate bias to be placed upon the grids 18 of the tubes. The negative end of the cathode resistor 20 is also connected to the two grids 18 through the center tap of the grid leak resistance 21 which also aids in biasing the grids. The grid leak resistor 21 in cooperation with the condensers $C_2$ serves to cause the oscillator to be self-starting and is usual in class C operating oscillators.

In order to more clearly explain the operation of the device, the various portions of the circuit will be explained as the description of the operation requires.

Assume that a piece of metal 10 has just been inserted in the coil $L_2$ and the oscillator is heating same. By previous adjustment of the shunt 21' across the relay $R_1$ said relay may have been adjusted to be energized at the maximum current in the plate circuit 14 corresponding to the point $P_2$ of the P curve. This point $P_2$ is just before the Curie point and when that point has been reached it will cause the contacts 22 and 23 to engage, closing thereby the circuit of the relay $R_2$ through the D. C. potential of the bridge rectifier 24.

This circuit includes the lead 25 within which are positioned the normally closed contacts 26 and 27 which are adapted to be separated at an appropriate time by the relay $R_4$. The positive side of the bridge rectifier 24 is connected to the relay $R_2$ by the lead 28.

It is noted that during this period the cut-off grid bias resistor 29 is short circuited through the contacts 30 and 31 and the contacts 32 and 33 associated with the relays $R_4$ and $R_7$ respectively which contacts are normally engaged. Hence, any voltage which might appear across the resistor will be short circuited and the grids 18 are biased according to the adjustment set on the cathode resistor 20 in accordance with the desired relations to the prevailing load conditions.

The alternating current poles of the bridge rectifier 24 are connected to the secondary of a transformer 35, the primary of which is connected across the alternating current line 36 through the usual line switches 37 and the micro-switch 38—39. The rectified current is hence fed from the bridge rectifier 24, which incidentally may be any type suitable to the equipment available, through the leads 25 and 28 to energize the relay $R_2$. The energizing of this relay will attract the contacts 40 and 41 to one another, same being normally open, thereby connecting the relay $R_2$ directly to the D. C. poles of the rectifier 24 and holding same in said connection independent of the relay $R_1$ and hence independent of the plate current in the plate circuit 14. At the same time, the contacts 42 and 43 which were heretofore separated will engage.

All of the above occurs almost instantaneously and within the time that the value of the plate current has dropped from its maximum to its steady state condition represented on the curve P by the Curie point $P_5$. In other words, along the current curve, the above described operations have occurred on the portion corresponding to $P_3$ of the P curve.

With the contacts 42 and 43 engaging, the device is ready for the operation of the mechanism designed to be actuated when the Curie point is reached.

When the Curie point of magnetic transformation $P_5$ is reached, the plate current in the coil $L_1$ is at a minimum inasmuch as the plate current follows the load. The circulating high frequency current in the tank circuit and coil $L_1$ is a maximum at this point, and hence the current in a secondary coil $L_3$ inductively positioned with respect to the coil $L_1$ will be a maximum. This secondary coil $L_3$ is connected in a secondary circuit 44 which includes, besides the coil $L_3$, a rectifying unit 45 such as a selenium or copper oxide rectifier, and a relay $R_3$ connected in series therewith. A condenser $C_3$ is connected across the circuit to smooth out the ripple in the direct current produced. The relay $R_3$ is designed to be energized when maximum current in the circuit 44 is reached, and hence when the Curie point is reached said relay will serve to attract the contacts 45' and 46. Inasmuch as the contacts 42 and 43 are being held closed by the relay $R_2$ the circuit from the rectifier will be closed for the relay $R_4$, through the contact 46, lead 47, relay $R_4$, lead 48 to the positive side of the rectifier, and from contact 45 through contacts 42 and 43, lead 25, and contacts 26 and 27 normally engaging, to the negative side of the rectifying bridge 24.

Immediately that the relay $R_4$ is energized, it causes engagement between the contacts 49 and 50, thereby directly connecting it to the bridge 24 independently of the other relays of the circuit, separating the contacts 26 and 27 and thereby releasing the relay $R_2$, and also causing opening of the contacts 30 and 31.

The opening of the contacts 30 and 31 removes the short circuit which existed around the resistor 29 through the leads 51, 52, and the contact 32, 33. Thus the resistor 29 is now inserted into the self-biasing cathode to grid circuit. This, of course, adds considerably to the bias of the grids 18 which are already quite negative, and moves the biasing voltage to a point so far past the cut-off grid voltage that the oscillations of the tubes are halted and the heating of the metal piece is interrupted.

The last described series of reactions occurs almost instantaneously and in effect the power of the oscillator is cut off just after or at the moment that the Curie point is reached. It is singular to note at this point that the time in which the metal is made to reach the Curie point is in the order of seconds. This is in connection with its use to treat saw-blades and small machine parts.

The sudden opening of the circuit containing the resistor 29 causes a sudden transient surge or impulse to be impressed upon the primary of the transformer 55. One side of the secondary of the transformer 55 is connected to the grid 56 of the gas-filled grid-controlled rectifier 57 through the grid resistor 58. The other side of the secondary of the transformer 55 is connected to the heater 59 of the cathode 60 of the rectifier 57 which heater is energized by a portion of the primary of the transformer 35. The alternating voltage of the line 36 is impressed across the primary of the transformer 35 which also parallels the plate circuit 61 of the grid-controlled rectifier 57, hence, the sudden impulse impressed on the grid 56 of the rectifier 57 from the transformer 55 will cause a passage of current in the plate circuit 61 and hence will energize a relay $R_5$ which is interposed in the plate circuit.

The energizing of the relay $R_5$ will cause engagement of the contacts 62 and 63 which connects the line 36 across the coil of the plunger relay $R_6$ through the normally closed micro-switch 38–39, thereby energizing the plunger relay $R_6$ and causing movement of its plunger 64. It should be recalled that the drawing is a diagrammatic representation, hence relative directions and mechanical details referred to are obviously explanatory only. Movement of the plunger 64 will cause the sliding plate 65 which is attached thereto by the link 66 to move to the left as viewed in the drawing. The solid portion 67 of the plate 65, which had been arranged to support the piece 10 while same was disposed within the heating coil $L_2$ moves out from under the piece 10 and the slotted portion 68 of the plate 65 moves into registry with the bore of the heating coil $L_2$ thereby causing the piece 10 to drop through the plate 65 and into the waiting quenching bath 69. Any other method of automatic quenching by use of a plunger or other type relay is contemplated by my invention, the above-described means being merely illustrative.

This last mentioned series of operations also occurs almost instantaneously so that the metal is quenched at the precise moment that it is cherry-red or any other desired color, or at any fraction of time thereafter as controlled by the responsive speed of the relays.

The final fraction of the movement of the plunger 64 is utilized in opening the contacts 38, 39 of the micro-switch which opens the line 36 and thereby cuts off the energizing current of any and all of the relays dependent thereon, thereby returning the entire system to normal condition poised for the next cycle of operations.

In order to prevent the operation of the oscillator when there is no load in the heater coil $L_2$, I provide a photo-electric system for opening the contacts 32 and 33. The source of light 70 directs a beam 71 across the path of the metal piece 10 at the cell and amplifier 72. When the beam 71 is interrupted by a metal piece 10, no current flows through the relay $R_7$ and the contacts 32 and 33 are closed. However, when the metal piece drops into the quenching bath 69 and out of the path of the beam 71, the beam is directed onto the cell and amplifier 72 energizing relay $R_7$ which opens the short circuit around the grid resistor 29 thereby cutting off the oscillations of the tubes 12, 12 so that no power is generated thereby. This, of course, is done by removing the short circuit from the grid resistor 29 and thereby causing the voltage across same to be added to the grid bias thereby biasing the grids 18 so far past cut-off that no appreciable plate current flows.

The above outlined procedure is entirely automatic, as will be obvious from the explanation thereof, the only thing not entirely controlled by the behaviorism of the metal itself being the feeding of the metal pieces into the heater coil. This, however, is quite possible by the installation of an appropriate mechanism to be actuated for example by the piece which is falling into the quenching bath or by any other obvious means whereby a continuous unattended process results.

The above described apparatus has been described in detail merely to illustrate a manner in which my invention may be applied. The auxiliary circuit 44 in which the relay $R_3$ may be made to operate at a point of high impedance of the load, and the plate circuit 14 containing the relay $R_1$ which may be made to operate at a point of low impedance of the load, are control circuits. The characteristic impedance curve Z is reflected in one control circuit and the charactristic power absorption curve is reflected in the other circuit, and said curves appear as current characteristics of the control circuits.

It thus appears that the control circuits may be made to perform any desired functions at practically any point or points with respect to to the P curve. The relays $R_2$ and $R_4$ aid in making the apparatus entirely automatic and are operated also by the control circuits. It is therefore obvious that functions which are desired can be accomplished directly by the control circuits.

For example, either of the relays R1 or R3 could directly open the circuit shorting out the resistor 29 at any desired point of the load characteristic; or either relay could serve to "fire" the gas filled triode 57 which could move the member 65 to quench the piece 10 at any given point of the P curve; or, the triode may be made to do any other desired work. The important feature is that the control circuit may be made to operate electrical or mechanical devices associated therewith upon reaching, or at a predetermined time after reaching, a given physical or electrical condition.

If it is desired that temperatures higher than those obtained by heating the metal piece 10 to the Curie point of magnetic transformation be reached, a greater flow of energy to the metal piece will be required, as previously explained. It hence will be necessary to change the impedance of the generator at that precise point, since, as will be noted from graph Z of Fig. 1, the impedance of the heating coil and its load is quite higher than under the initial conditions at which the generator impedance was substantially matched to that of the load.

Figure 3:
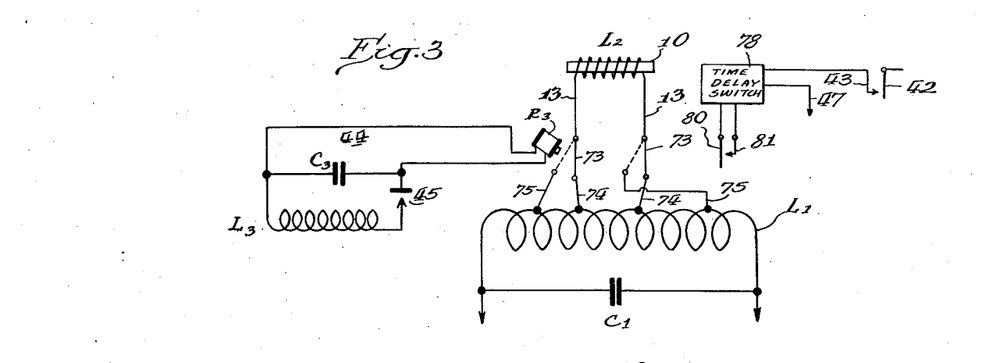
Fig. 3 and Fig. 4 are detailed portions of circuits of the apparatus of my invention, showing modifications thereof.

In case, instead of utilizing the relay R3 only for the purpose of operating other relays to cut off the oscillating tubes, relay R3 is arranged to also switch the leads of the coil L2 to a greater number of turns as shown in Fig. 3 at the Curie point. In this manner, the heating coil L2 and its load impedance are rematched to the tank circuit and its impedance. This is required in order to force power to be absorbed by the metal piece 10. The contacts 73 in leads 13 are switched by means of the relay R3 of the secondary circuit 44 from the low number of turns connected by means of the leads 74 to the higher number of turns connected to the coil L1 by the leads 75.

In order to determine how long the metal piece is to be subject to this greater influx of power, a measurement of the high frequency power being absorbed may be made by means of a high-frequency wattmeter such as described in United States Letters Patent No. 2,240,955 for a High frequency wattmeter, issued to me on May 6th, 1941. Since the volume and specific heat of the piece of metal are known, the temperature it will reach may be determined for any given power absorbed or, if heating of the piece to any particular temperature is desired, the amount of calories absorbed by it by the metal piece being known from the power measurement, the time required for the piece to reach the desired temperature can be calculated.

There are other ways in which to determine the time necessary to reach the desired temperature, such as by experimentation, or other empirical methods.

Assuming that the desired time has been determined, a time delay or timing switch 78 is set accordingly. When the relay R3 switches the contacts 73 from the leads 74 to the leads 75, the relay at the same time will close the contacts 80 and 81 which cause the operation of the time switch 78. The switch will close after the length of time chosen during which time the oscillator is operating at a greater power output and is heating the metal past the Curie point the desired amount. When the switch finally closes, its effect is the same as the previously described operation of the relay R3 in causing engagement between the contacts 45 and 46 to cut off the oscillations of the oscillator and subsequently quench the metal piece 10 or remove same from within the coil L2. Consequently the leads from the switch 78 are connected to the lead 47 and the contact 43 respectively.

Another way of accomplishing the same purpose is to use an auxiliary relay R3' in the circuit 44 and which will operate at precisely the same time that the relay R3 operates to rematch the impedance of the oscillator. This is shown symbolically in Fig. 4 in which the contacts 76 and 77 of the time delay switch 78 will engage at the same time that the Curie point is reached. Following this, and after the time chosen and set on the time delay switch has elapsed, the circuit from the power source 79 to the plunger relay R6 will be closed causing the movement of the plunger 64, link 66, and plate 65, thereby causing the metal piece 10 to be removed from the coil L2. At the same instant that the time delay switch operates to actuate the plunger 64 it will also operate through the leads 82 to cut off the oscillator in the previously described manner. These leads are connected to the lead 47 and the contact 43 and hence the time delay switch 78 also takes the place of the contacts 45 and 46.

Figure 4:
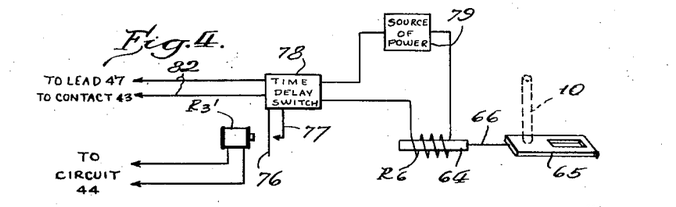

Other ways of accomplishing the same purpose should suggest themselves to those skilled in the art; such as the insertion of a time delay switch 78 in the grid circuit 56 of the grid-controlled rectifier 57, or installing such a switch in other convenient places of the circuit to cause similar operation.

It will be noted that the source of power symbolically shown in Fig. 4 is intended to represent any source of power coextensive with the apparatus of the circuit, such as for example the A. C. source 36 shown in Fig. 2 and the switches, relays, etc., which are normally in the circuit but not shown for the purposes of clarity.

While I have described methods and apparatus for the heating of metals to points at and above the Curie point of magnetic transformation, it sometimes is desirable to heat the metals to points below the Curie point, such as for example in annealing or the like. The same method of cutting off the oscillator as described above can be used to cut off the oscillator before the Curie point is reached. The meter 16 in the plate circuit measures the plate current and consequently also provides indications of the corresponding values of the power absorbed by the load according to the curve P. Since the curve P has a definite relation to the temperature of the metal, the meter 16 can be calibrated as a temperature indicator. In the heating of pieces of metal which will heat up relatively slowly the metal piece may be "kicked" out of the coil at any desired temperature as indicated by the meter 16, by the manual actuation of mechanical means well known in the art.

If it is desired that this be done automatically, it is possible to adjust the relays R1 and R3 to operate at any desired point of the P curve. For example, if it is desired that the metal piece be heated only up to a temperature corresponding to the point X on the P curve, the relay R1 may be adjusted to operate at the maximum point of the curve, namely at P2 to prepare the circuits for the relays R2 and R4 for operation by the relay R3. The relay R3 having been previously adjusted for operation when the plate current reaches a value corresponding to the point X on the power absorption curve, these relays R2 and R4 will be operated to cut off the oscillator before the Curie point is reached and permitting the piece 10 to be dropped out of the coil L2 in the manner previously described, but not necessarily into a quenching bath.

Likewise, the operations of relays at various points of the curve, that is, at various temperatures, may be controlled by adjustment of the response characteristics thereof in well known manners, to cause the oscillator to be shut off at any precise point of the P curve desired.

It is obvious that my invention is applicable to a wide variety of use, and entirely eliminates any of the disadvantages of other methods of induction heating. It is also obvious that many of the advantages and features of my invention are in no wise shown or suggested in other methods of and apparatuses for induction heating.

It is believed that my invention, its mode of construction, arrangement, assembly, association of parts, the mode of practicing the method thereof, and many of the advantages and features should be readily understood from the foregoing without further description, and it should also be manifest that while a preferred embodiment of the invention has been shown and described for illustrative purposes, the details are nevertheless capable of wide variation within the purview of my invention as defined in the appended claims.

What I claim and desire to secure by Letters Patent of the United States is:

1. The method of heat treating an object the electrical characteristics of which vary with temperature, which method comprises closely coupling an object to be heated with heating means to which high frequency energy is supplied from an electronic high frequency generator so that the impedance of the heating means varies proportionately with the variation in electrical characteristics of the object, coupling said heating means to the generator of high frequency electrical energy at substantially unity impedance ratio between the equivalent resultant impedance of the heating means with the object coupled to it and the internal impedance of the generator between the points of coupling, and varying the last coupling to maintain that impedance ratio substantially equal to unity as the electrical characteristics of the object vary with temperature.

2. The method of heat treating a metal object, which comprises inserting the metal in an electromagnetic field, closely coupling a coil creating the field to a branch of the tank circuit of a high frequency, self-controlled generator, setting the Q of the tank circuit to obtain a predetermined loss resistance across the points of coupling to the generator substantially equal to the effective loss resistance of the coil with the metal in its electromagnetic field, and decreasing the Q of the tank circuit as the permeability of the metal decreases to reestablish substantial equality between the increased effective loss resistance of the coil with the metal in its field and the loss resistance of the generator across the points of coupling to the tank circuit.

3. The method of heat treating an object, which comprises inserting the object in an electrical field, closely coupling heating means creating the field to a branch of the tank circuit of a high frequency, electronic tube generator, setting the Q of the tank circuit with the object in the electrical field to provide across the tank circuit an effective loss resistance substantially equal to the internal resistance of the electronic tube generator, and varying the Q of the tank circuit as the effective load resistance of the object increases with temperature to reestablish across the tank circuit an equivalent loss resistance substantially equal to the internal resistance of the electronic tube generator.

4. In a heat treating apparatus, a high frequency generator having a frequency determining parallel resonant circuit, a heater constructed for close coupling to an object to be heated whereby the impedance of the coil varies proportionately to the temperature of the object when energized from said generator, and a circuit including said heater and connecting the heater in an untuned branch of the frequency determining resonant circuit as a relatively small portion only of the impedance of said branch.

5. In a heat treating apparatus, a high frequency generator having a frequency determining resonant circuit, a heater for producing a high frequency heat providing electrical field when energized from said generator, an untuned circuit including said heater and coupled to the frequency determining resonant circuit, and means responsive to a change in impedance of the heater circuit for automatically increasing the tightness of the coupling as the impedance of the heater circuit increases.

6. In a heat treating apparatus, a self-excited oscillator including a frequency determining circuit, and electronic energy control means for supplying energy to said circuit at its resonance frequency, an induction heater coil adapted to receive a metal charge to be heated and closely coupled to said frequency determining circuit to reflect an equivalent impedance into said circuit, the ratio of coupling being predetermined to provide a resultant circuit impedance substantially equal to the internal impedance of the electronic energy-supplying means, and means controlled by said circuit for varying said coupling ratio to maintain the circuit impedance substantially equal to the internal impedance of the electronic energy supplying means as the equivalent impedance reflected into said circuit varies with the temperature of the charge.

7. A method of transferring energy from a class C electronic oscillator to a metal member to heat the latter, which method comprises coupling a heating means to the oscillator at a predetermined coupling ratio substantially equal to the ratio of the terminal impedance of the oscillator to the impedance of the device with the object in the electrical field thereof to match the coupled impedance to the terminal impedance of the oscillator, and changing the coupling ratio a predetermined amount when the plate current of the oscillator decreases to a predetermined value to substantially rematch the coupled impedance to the internal impedance of the oscillator.

8. A method of controlling a supply of energy from a high frequency electronic oscillator to a heating means, which method comprises coupling the heating means with the object to be heated in the electrical field thereof to the oscillator at a coupling ratio predetermined to provide a given plate current in the oscillator, and varying the coupling ratio a predetermined amount upon predetermined variation of the plate current to effect an opposite change in the plate current thereby to increase the energy supplied by the oscillator to the member being heated.

9. In a heat treating apparatus, a high frequency electronic tube generator, means including an induction heater coil forming with a metal member to be heated a load connected between output terminals of the generator to receive power from the generator for heating the metal member when in the field of the coil, said generator including a variable impedance coupler preset to match the impedance of the generator between its output terminals to the equivalent impedance of the load between its input terminals, means responsive to the generator for varying said impedance coupler automatically as the metal member on heating varies the equivalent impedance of the load to rematch the impedance of the generator between its output terminals to the changed equivalent impedance of the load between its input terminals, timing means connected to said generator and preset to automatically render said generator ineffective to supply energy to the load a predetermined time after initiation of the operation of said timing means, and means controlled by the generator for initiating operation of said timing means simultaneously with the automatic rematching of the load to the generator.

10. In a heat treating apparatus, a high frequency oscillator circuit including electronic tube means, means for biasing the electronic tube means sufficiently negative to cause the plate current to vary with the load, an induction coil for heating a piece of metal in the field of the coil, means for adjustably coupling said coil to said oscillator circuit at a ratio such that the impedance of the oscillator circuit is matched to the resultant impedance of the induction coil when the piece of metal is in the field of said coil, and means responsive to the plate current or voltage of the oscillator for adjusting said coupling means as the resultant impedance of the coil varies with the heating of the metal to rematch the impedance of the oscillator circuit to the resultant impedance of the coil.

11. In a heat treating apparatus, an electronic tube oscillator circuit having the grid circuit of the electronic tube biased substantially beyond the plate current cut off so that the plate current varies with the loss resistance of the oscillator tank circuit, an induction heater coil adapted to have a piece of metal inserted therein for heating thereby, means for adjustably coupling said coil to the oscillator tank circuit at a ratio such that the equivalent loss resistance reflected into the tank circuit with the metal to be heated in the coil plus the loss resistance of the tank circuit is substantially equal to the internal impedance of the oscillator across the tank circuit, and means controlled by the current or voltage of the tank circuit for adjusting said coupling means upon a predetermined variation in the impedance of the heater coil as the temperature of the metal varies to substantially rematch the reflected loss resistance in the tank circuit plus the loss resistance of the tank circuit to the impedance of the oscillator across the tank circuit.

12. In a heat treating apparatus, an electronic tube oscillator having its grid circuit biased sufficiently to cause the plate current to vary with the loss resistance of its tank circuit, an induction heater coil adapted to receive a piece of metal for heating the same, means for adjustably coupling said coil to the tank circuit of the oscillator at a coupling ratio such that the loss resistance reflected into the tank circuit from the heater coil with the metal to be heated therein is substantially equal to the internal impedance of the oscillator across said tank circuit, said piece of metal on being heated increasing and then decreasing in permeability as the temperature thereof rises, and thereby increasing and decreasing the plate current of the oscillator correspondingly, means responsive to the plate current of the oscillator for adjusting said coupling means as the permeability of the metal decreases to rematch the loss resistance reflected into the tank circuit to the internal impedance of the oscillator across the tank circuit, and means responsive to the plate current of the oscillator for preventing operation of said coupling adjusting means during increase of the plate current as the permeability of the metal increases.

13. In a high frequency thermionic generating system having a high frequency, internal impedance between the input terminals of its tank circuit, comprising an induction heater for heating a metal member when in the field of the coil, said heater coil being connected in shunt to a predetermined fraction of the turns of the inductance coil of the tank circuit to match the resultant impedance of the tank circuit to the internal impedance of the system between said tank circuit input terminals, and means controlled by the tank circuit for varying the shunt connection between the heater coil and the inductance coil of the tank circuit to rematch the resultant impedance of said tank circuit to the internal impedance of the system between the input terminals of the tank circuit as the metal members in being heated is brought to a temperature substantially approximating the Curie point of magnetic transformation.

14. In a heat treating apparatus, an electronic oscillator circuit including a tank circuit, an induction heater coil for heating a metal charge in the field of the coil, means for adjustably and closely coupling said heater coil to said tank circuit to reflect an equivalent loss resistance into the tank circuit, said coupling means being adjusted to match the impedance of the tank circuit with said equivalent loss resistance to the internal impedance of the oscillator circuit across the tank circuit input terminals, a coil coupled to said tank circuit, a first relay energized by said last-mentioned coil, means including a second relay controlled by the current supplied to the tank circuit, means controlled by the first relay for changing said coupling means to rematch the impedance of the tank circuit with the loss resistance reflected thereinto from the heater coil to the internal impedance of the oscillator circuit across the tank circuit input terminals as the permeability of the metal charge decreases with increasing temperature, and means controlled by the second relay for rendering said oscillator ineffective during changing of said coupling.

15. In a heat treating apparatus, an electronic oscillator circuit including a tank circuit, an induction heater coil for heating a metal charge in the field of the coil, means for adjustably and closely coupling said heater coil to said tank circuit to reflect an equivalent loss resistance into the tank circuit, said coupling means being adjusted to match the impedance of the tank circuit with said equivalent loss resistance to the internal impedance of the oscillator circuit across the tank circuit input terminals, a coil coupled to said tank circuit, a first relay energized by said last-mentioned coil, means including a second relay controlled by the current supplied by the tank circuit, means controlled by the first relay for changing said coupling means to rematch the impedance of the tank circuit with the loss resistance reflected thereinto from the heater coil to the internal impedance of the oscillator circuit across the tank circuit input terminals as the permeability of the metal charge decreases with increasing temperature, means controlled by the second relay for rendering said oscillator ineffective during changing of said coupling, timing means for rendering said oscillator ineffective to supply energy to said heater coil, and means controlled by one of said relays for initiating operation of said timing means upon changing of said coupling.

EUGEN MITTELMANN.